(12) United States Patent
Zhang et al.

(10) Patent No.: US 11,820,842 B2
(45) Date of Patent: Nov. 21, 2023

(54) SULFONATED POLYMER

(71) Applicant: Saudi Arabian Oil Company, Dhahran (SA)

(72) Inventors: Xuan Zhang, Beijing (CN); Ming Han, Dhahran (SA); Jian Hou, Beijing (CN); Jinxun Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 661 days.

(21) Appl. No.: 17/015,799

(22) Filed: Sep. 9, 2020

(65) Prior Publication Data

US 2022/0073662 A1    Mar. 10, 2022

(51) Int. Cl.

| | |
|---|---|
| *C08F 212/14* | (2006.01) |
| *C08F 2/01* | (2006.01) |
| *C08F 2/04* | (2006.01) |
| *C08F 2/38* | (2006.01) |
| *C08F 2/44* | (2006.01) |
| *C08F 220/58* | (2006.01) |
| *C08F 226/02* | (2006.01) |

(Continued)

(52) U.S. Cl.
CPC ............ *C08F 212/30* (2020.02); *C08F 2/01* (2013.01); *C08F 2/04* (2013.01); *C08F 2/38* (2013.01); *C08F 2/44* (2013.01); *C08F 220/585* (2020.02); *C08F 226/02* (2013.01); *C08K 3/30* (2013.01); *C08K 5/23* (2013.01); *C08F 2800/10* (2013.01); *C08K 2003/3045* (2013.01)

(58) Field of Classification Search
None
See application file for complete search history.

(56) References Cited

U.S. PATENT DOCUMENTS

| | | |
|---|---|---|
| 4,274,283 A | 6/1981 | Maus et al. |
| 4,283,321 A | 8/1981 | Chakrabarti et al. |
| (Continued) | | |

FOREIGN PATENT DOCUMENTS

| | | |
|---|---|---|
| CA | 2384108 | 7/2011 |
| CN | 103806905 | 5/2014 |
| (Continued) | | |

OTHER PUBLICATIONS

PCT International Search Report and Written Opinion in International Appln. No. PCT/US2021/043630, dated Nov. 22, 2021, 14 pages.

(Continued)

*Primary Examiner* — Randy P Gulakowski
*Assistant Examiner* — Ha S Nguyen
(74) *Attorney, Agent, or Firm* — Fish & Richardson P.C.

(57) ABSTRACT

Copolymer compositions and methods of making copolymer compositions with enhanced stability in high temperature and high salinity environments. The copolymers include hydrophobic monomers and sulfonated monomers. The sulfonated monomers can include 2-acrylamido-2-methylpropane sulfonic acid and allyl sulfonate. The sulfonated monomers increase the stability of the polymers in harsh conditions, and in high temperature, high salinity environments. The sulfonated monomers also reduce or prevent the hydrolysis of acrylamide groups, and therefore enhance the stability of the copolymer. The copolymer compositions can be made with free radical polymerization and an initiation complex.

24 Claims, 11 Drawing Sheets

(51) Int. Cl.
  *C08K 3/30* (2006.01)
  *C08K 5/23* (2006.01)
  *C09K 8/035* (2006.01)

(56) References Cited

U.S. PATENT DOCUMENTS

| | | | |
|---|---|---|---|
| 4,526,947 A * | 7/1985 | Castner | C09K 8/588 526/287 |
| 4,691,558 A | 9/1987 | Vinson et al. | |
| 4,719,423 A | 1/1988 | Vinegar et al. | |
| 4,979,390 A | 12/1990 | Schupack et al. | |
| 5,101,903 A | 4/1992 | Llave et al. | |
| 5,387,865 A | 2/1995 | Jerosch-Herold et al. | |
| 6,414,170 B1 | 7/2002 | Kim et al. | |
| 7,169,745 B2 | 1/2007 | Kasturi et al. | |
| 7,254,091 B1 | 8/2007 | Gunning | |
| 8,260,589 B1 | 9/2012 | Kumar | |
| 9,388,263 B2 | 7/2016 | Nakano et al. | |
| 11,286,232 B2 | 3/2022 | Zhang et al. | |
| 2009/0259446 A1 | 10/2009 | Zhang | |
| 2010/0234252 A1 | 9/2010 | Moradi-Araghi et al. | |
| 2011/0004447 A1 | 1/2011 | Hurley et al. | |
| 2012/0221306 A1 | 8/2012 | Hurley et al. | |
| 2012/0273193 A1 | 11/2012 | Sen et al. | |
| 2012/0281883 A1 | 11/2012 | Hurley et al. | |
| 2013/0180327 A1 | 7/2013 | Frederick | |
| 2013/0235412 A1 | 9/2013 | Baldwin | |
| 2014/0076544 A1 | 3/2014 | Lecerf et al. | |
| 2014/0144628 A1 | 5/2014 | Moradi-Araghi et al. | |
| 2016/0305922 A1 | 10/2016 | Narang et al. | |
| 2017/0285122 A1 | 10/2017 | Kaditz et al. | |
| 2022/0033348 A1 | 2/2022 | Zhang et al. | |
| 2022/0106260 A1 | 4/2022 | Zhang et al. | |
| 2022/0106261 A1 | 4/2022 | Zhang et al. | |
| 2022/0106262 A1 | 4/2022 | Zhang et al. | |

FOREIGN PATENT DOCUMENTS

| | | | |
|---|---|---|---|
| CN | 106543359 A * | 3/2017 | |
| CN | 107841303 A * | 3/2018 | |
| CN | 108642879 | 10/2018 | |
| EP | 0474284 | 3/1992 | |
| GB | 2262117 | 6/1993 | |
| WO | WO 2010105070 | 9/2010 | |
| WO | WO 2012061098 | 5/2012 | |
| WO | WO 2014003596 | 1/2014 | |
| WO | WO-2014077515 A1 * | 5/2014 | |
| WO | WO 2014082001 | 5/2014 | |
| WO | WO-2014139074 A1 * | 9/2014 | |
| WO | WO 2019231479 | 12/2019 | |

OTHER PUBLICATIONS

Yu et al., "Synthesis of Novel Zwitterionic Heterogemini Surfactants Derived from Fatty Acid and Investigation of Their Behavior at the Air-Water Interface," Letters in Organic Chemistry, Aug. 2015, 12(8): 590-597, 7 pages.

Al-Muntasheri et al., "Gelation Kinetics and Performance Evaluation of an Organically Crosslinked Gel at High Temperature and Pressure," SPE Journal, Sep. 2008, 337-345, 8 pages.

Al-Muntasheri et al., "Viscoelastic properties of a high temperature cross-linked water shut-off polymeric gel," Journal of Petroleum Science and Engineering, Apr. 2006, 55:2007 (56-66), 11 pages.

Alshehri et al., "Pore-Level Mechanics of Forced and Spontaneous Imbibition of Aqueous Surfactant Solutions in Fractured Porous Media," SPE 124946, Society of Petroleum Engineers (SPE), presented at the 2009 SPE Annual Technical Conference and Exhibition, Oct. 4-7, 2009, 17 pages.

Baskar et al., "Associated structures of aqueous solution of comb-like polymers from 2-acrylamido-2-methyl-1-propanesulfonic acid, dodecylmethacrylate and poly (ethyleneglycol) acrylate macromonomer," Polymer, 2004, 45: 6507-6517, 11 pages.

Bou-Mikael, "Design and Optimization of 2.5 Dimension Porous Media Micromodel for Nanosensor Flow Experiments," A Thesis Submitted to the Graduate Faculty of the Louisiana State University and Agricultural and Mechanical College in Partial Fulfillment of the Requirements for the Degree of Masters of Science in Chemical Engineering in the Gordon A. and Mary Cain Department of Chemical Engineering, May 2012, 84 pages.

Brown et al. "Experimental observation of fluid flow channels in a single fracture," Journal of Geophysical Research, 103:B3 (5125-5132), Mar. 10, 1998, 8 pages.

Bryant et al., "Influence of Syneresis on Permeability Reduction by Polymer Gels," SPE35446, Society of Petroleum Engineers (SPE), SPE Production & Facilities, Nov. 1996, 7 pages.

Buchgraber et al., "The Displacement of Viscous Oil by Associative Polymer Solutions," SPE 122400, Society of Petroleum Engineers (SPE), presented at the 2009 SPE ATCE Annual Conference and Exhibition, Oct. 4-7, 2009, 19 pages.

Chang et al., "Effective Porosity, Producible Fluid and Permeability in Carbonate from Nmr Logging," SPWLA-1994-A, Society of Petrophysicists and Well-Log Analysts (SPWLA), presented at the SPWLA 35th Annual Logging Symposium, Jun. 19-22, 1994, 2 pages, Abstract only.

Chen et al., "Pore-Connectivity Based Permeability Model for Complex Carbonate Formations," Sociey of Petrophysicists and Well-Log Analysts (SPWLA), SPLWA 49th Annual Logging Symposium, May 25-28, 2008, 11 pages.

Chu et al., "A facile route towards the preparation of ultra-long-chain amidosulfobetaine surfactants," Synlett, 16: 2655-2658, 2009, 4 pages.

Chu et al., "Wormlike micelles and solution properties of a C22-tailed amidosulfobetaine surfactant," Langmuir, 26:11 (7783-7791), 2010, 9 pages.

Diacomo et al., "Mechanism of Polyacrylamide Gel Syneresis Determined by C-13 NMR," SPE 11787, Society of Petroleum Engineers (SPE), International Symposium on Oilfield and Geothermal Chemistry, Jun. 1-3, 1983, 8 pages.

Freedman et al., "Hydrcarbon Saturation and Viscosity Estimation From Nmr Logging in the Belridge Diatomite," SPWLA-1997-v38n2a1, Society of Petrophysicists and Well-Log Analysts (SPWLA), the Log Analyst, 38:2, Mar. 1997, 2 pages, Abstract only.

Haddad et al., "So What is the Reservoir Permeability?" SPE 63138, Society of Petroleum Engineers (SPE), presented at the Annual Technical Conference and Exhibition, Oct. 1-4, 2000, 24 pages.

Hajizadeh et al., "An Algorithm for 3D Pore Space Reconstruction from a 2D Image Using Sequential Simulation and Gradual Deformation with the Probability Perturbation Sampler," Transport in Porous Media, Kluwer Academic Publishers, Do., 94:3 (859-881), Jun. 20, 2012, 23 pages.

Haralick et al., "Computer Classification of Reservoir Sandstones," Sep. 11, 1972, 171-177, 7 pages.

Hasiuk, "Making Things Geological: 3-D Printing in the Geosciences," The Geological Society of America (GSA), Groundwork, GSA Today, 24:8 (28-29), Aug. 2014, 2 pages.

He et al., "Comparison of Gelatin Behavior and Morphology of Resocinol—Hexamethylenetetramine—HPAM Gel in Bulk and Porous Media," Transport Porous Media, 2015, 109:377-392, 16 pages.

Hornbrook, "Visualization of Foam/Oil Interactions in a New, High Resolution Sandston Replica Micromodel," a Report Submitted to the Department of Petroleum Engineering of Stanford University in Partial Fulfillment of the Requirements for the Degree of Master of Science, Sep. 1991, 48 pages.

Inwood, "High-Resolution, Microvisual Study of High Mobility Ratio, Immiscible Displacements," a Thesis Submitted to the Department of Petroleum Engineering of Stanford University in Partial Fulfillment of the Requirements for the Degree of Master Science, Jun. 2008, 104 pages.

Ishutov et al., "3-D Printing Artificial Reservoir Rocks to Test their Petrophysical Properties," Search and Discovery Article #41427, Aug. 29, 2014, 18 pages.

Jaber, "Low Tension Methods for Fractured Resources," a Thesis Submitted to the Department of Energy Resources Engineering of Stanford University in Partial Fulfillment of the Requirements for the Degree of Master of Science, Jun. 2009, 82 pages.

(56) References Cited

OTHER PUBLICATIONS

Kwak et al., "Close Monitoring of Gel Based Conformance Control by NMR Techniques," SPE-183719-MS-MS, Society of Petroleum Engineers (SPE), presented at the SPE middle East Oil and Gas Show and Conference, Mar. 6-9, 2017, 15 pages.

Li et al., "Synthesis, evaluation and aqueous solution behavior of the cationic fluorinated hydrophobically associating polyacrylamide," Journal of Polymer Research, 2019, 26:35, 11 pages.

Lu et al., "An advanced method for the preparation of erucyl dimethyl amidopropyl betaine and acid solution properties," Tenside Surfactants Detergents, 49:6 (TS110215-25.9.12 dk/stm köthen), 2012, 6 pages.

Maiti and De, "RAFT polymerization of fatty acid containing monomers," RSC Advances, RSC Publishing, 3: 24983, 2013, 9 pages.

Natarajan et al., "Control of In-Situ Gelation Time for HPAAM-Chromium Acetate Systems," SPE 39696, Society of Petroleum Engineers (SPE), presented at the 1998 SPE/DOE Improved Oil Recovery Symposium, Apr. 19-22, 1998, 13 pages.

Qi et al., "Synthesis, Characterization, and Solution Behavior of a Long-Chain Hydrophobic Association Anionic Acrylamide/2-Acrylamido-2-Methylpropanesulfonic Acid/n-Octyl Acrylate Terpolymers," Arabian Journal for Science and Engineering, 2017, 42:6 (2425-2432), 8 pages.

Rangel-German et al., "A Micromodel Investigation of Two-Phase Matrix-Fracture Transfer Mechanisms," Water Resources Research, 42:W03401, Mar. 7, 2006, 13 pages.

Renoux et al., "Aqueous solution properties of hydrophobically associating copolymers," Progress Colloid and Polymer Science, 1994, 97:213-217, 5 pages.

Romero-Zeron et al., "Characterization of Crosslinked Gel Kinetics and Gel Strength by Use of NMR," SPE 86548, Society of Petroleum Engineers (SPE), presented at the SPE International Symposium and Exhibition on Formation Damage Control, Feb. 18-20, 2004, 12 pages.

Smith, "Hot New Additive Manufacturing Materials" in Protype / Manufacture Nov. 1, 2011, retrieved from URL <http://www.digitaleng.news/de/hot-new-additive-manufacturing-materials>, 2011, 12 pages.

Straley et al., "Core analysis by low field NMR," SCA-9404, Society of Core Analysis (SCA), presented at the 1994 International Symposium, Sep. 12-14, 1994, 14 pages.

Sydansk, "Acrylamide-Polymer/Chromium(III)-Carboxylate Gels for Near Wellbore Matrix Treatments," Society of Petroleum Engineers (SPE), SPE Advanced Technology Series, Jan. 1990, 1:1 (146-152), 7 pages.

Tsang et al., "Flow Channeling in a Single Fracture as a Two-Dimensional Strongly Heterogeneous Permeable Medium," Water Resources Research, 25:9 (2076-2080), Sep. 1989, 5 pages.

Vasquez et al., "Laboratory Evaluation of High-Temperature Conformance Olymer Systems," SPE 80904, Society of Petroleum Engineers (SPE), presented at the SPE Production and Operations Symposium, Mar. 22-25, 2003, 11 pages.

Wang et al., "The Study of Porous Media Reconstruction using a 2D Micro-CT Image and MPS," Computational Intelligence and Software Engineering, Dec. 11, 2009, 5 pages.

Wu and Batycky, "Evaluation of miscibility from slim tube tests," PETSOC-90-06-06, Petroleum Society of Canada, Enhanced Oil Recovery, Journal of Canadian Petroleum Technology, JCPT 90-06-06, 29:6, Nov.-Dec. 1990, 9 pages.

Yamamoto et al., "Associative Properties in Water of Copolymers of Sodium 2-(Acrylamido)-2-methylpropanesulfonate and Methacrylamides Substituted with Alkyl Groups of Varying Lengths," Macromolecules Nov. 1, 2000, 33: 7852-7861, 10 pages.

Yang et al., "Self-assembly properties of ultra-long-chain gemini surfactants bearing multiple amide groups with high performance in fracturing fluid application," Colloids and Surfaces A: Physicochemical and Engineering Aspects, 523:62, 2017, 32 pages.

Yao et al., "Petrophysical characterization of coals by low-field nuclear magnetic resonance (NMR)," Fuel 89:7 (1371-1380), Jul. 2010, 10 pages.

Zhang et al., "Novel hydrophobically associative polyacrylamide with tunable viscosity," Chinese Chemical Letters, Feb. 2009, 20:1361-1365, 5 pages.

Zhong et al., "Associative behavior in aqueous solutions for a salt-thickening tetra-polymer with allyl-capped macro-monomer," Polymer Science, Ser. A, 2014, 56:4 (422-433), 12 pages.

Zhuang et al., "Permeability Modification with Sulfomethylated Resorcinol-Formaldehyde Gel System," SPE 37245-MS, Society of Petroleum Engineers (SPE), presented at the 1997 SPE International Symposium on Oilfield Chemistry, Feb. 18-21, 1997, 8 pages.

PCT International Search Report and Written Opinion in International Appln. No. PCT/US2021/049670, dated Dec. 13, 2021, 15 pages.

Wang et al., "The N-allyl substituted effect on wormlike micelles and salt tolerance of a C 22-tailed cationic surfactant" Soft Matter 13.40, Jan. 2017, 7425-7432, 8 pages.

\* cited by examiner

SULFONATED POLYMER

TECHNICAL FIELD

This document relates to methods and compositions used in treating subterranean formations for enhancing hydrocarbon fluid recovery.

BACKGROUND

Polyacrylamide has good stability and is highly viscous in water. Polyacrylamide is used in chemical enhanced oil recovery (EOR) to control displacing fluid mobility and to improve sweep efficiency. However, polyacrylamide is susceptible to degradation due to chemical hydrolysis of the amide groups at high temperatures and high salinities, for example temperatures at or above 70° C. and salinities at or above 40,000 ppm. At these conditions, the viscosity of polyacrylamide injected fluids is reduced.

SUMMARY

In some implementations, a composition includes a compound of the formula $$\left[\begin{array}{c} H \\ C \\ | \\ R \end{array}\right]_n,$$

where n is 40-400 and at each instance R is independently selected from the group consisting of $R_1$, $R_2$ and $R_3$, and where
$R_1$ is

[structure: —C(=O)—N(H)—C(CH_3)_2—CH_2—SO_3Na]

$R_2$ is

[structure: phenyl —SO_3Na]

and
$R_3$ is

[structure: quaternary ammonium with erucyl amidopropyl group, X⁻]

and where X is halide.

In some implementations, a method of preparing a compound having a formula $$\left[\begin{array}{c} H \\ C \\ | \\ R \end{array}\right]_n,$$

where n is 40-400 and at each instance R is independently selected from the group consisting of $R_1$, $R_2$ and $R_3$, and where
$R_1$ is

[structure: —C(=O)—N(H)—C(CH_3)_2—CH_2—SO_3Na]

$R_2$ is

[structure: phenyl —SO_3Na]

and
$R_3$ is

[structure: quaternary ammonium with erucyl amidopropyl group, X⁻]

and where X is halide, includes combining reactants in a reaction chamber. The reactants include 2-acrylamido-2-methylpropane sulfonic acid, a p-styrenesulfonate salt, and a erucyl amidopropyl dimethyl allyl ammonium salt. The method includes purging the reaction chamber with an inert gas, initiating a free radical polymerization in a polymerization reaction solution, and purifying the compound.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
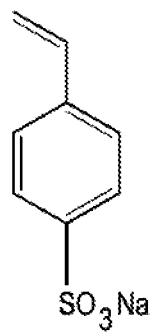
FIG. 1 is a schematic of the chemical structure of 2-acrylamido-2-methylpropane sulfonic acid (AMPS).

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

This disclosure describes copolymer compositions with enhanced stability in high temperature and high salinity environments. The copolymers described herein include hydrophobic monomers and sulfonated monomers. The sulfonated monomers can include, for example, 2-acrylamido-2-methylpropane sulfonic acid and allyl sulfonate. The sulfonated monomers increase the stability of the polymers in harsh conditions, for example in high temperature, high salinity environments. The sulfonated monomers also reduce or prevent the hydrolysis of acrylamide groups, and therefore enhance the stability of the copolymer.

In some EOR situations, associative polyacrylamide is utilized as a viscosifying agent. Associative polyacrylamide typically contains a small number of hydrophobic groups, for example, less than 1 mol % hydrophobic groups. These hydrophobic groups can be distributed in blocks or at random along the polyacrylamide backbone. Associative polyacrylamide, with existing hydrophobic groups, can form aggregates to minimize exposure of the molecules to water, which improves salt tolerance in high salinity environments. However, these associative polyacrylamide polymers are limited by unwanted precipitation and significant degradation at high temperatures and high salinities. Therefore, there is a need for a polymer that is stable at high temperatures, and does not hydrolyze or precipitate, even in high temperature, high salinity environments.

This application describes a sulfonated polymer that includes hydrophobic monomers and sulfonated monomers. The hydrophobic monomers improve the salt tolerance of the polymer. The sulfonated monomers improve the stability of the polymer. Accordingly, this copolymer has good stability and high salt tolerance, even in high temperature, high salinity environments, for example, in the environments found in enhanced oil recovery.

The copolymer can be synthesized using free radical polymerization. In free radical polymerization, initiators are added to a solution of monomers that contain at least one vinyl bond. The initiators react with the vinyl bond on a vinyl-containing monomer, forming another free radical. The newly formed free radical bonds with a subsequent vinyl-containing monomer, forming a bond between the two monomers but propagating the free radical for additional bond formation. In some implementations, the initiators can include at least one of potassium persulfate ($K_2S_2O_8$), sodium bisulfite ($NaHSO_3$), and 2,2'-azobis [2-(2-imidazolin-2-yl)propane]dihydrochloride (AIBI). In some implementations, an initiator complex is used to initiate polymerization. For example, the initiation complex can include $K_2S_2O_3$—$NaHSO_3$ (2/1 weight ratio) and AIBI, where the polymerization reaction solution is 0.01-0.2% $K_2S_2O_3$ and 0.05%-0.2 wt % AIBI.

Mixing the monomers and the initiators initiates polymerization. The number of monomers in the polymer, in other words, the degree of polymerization, can be controlled by adjusting the ratio of monomers to initiators, or adjusting the temperature, concentration, or solvent.

Figure 2:
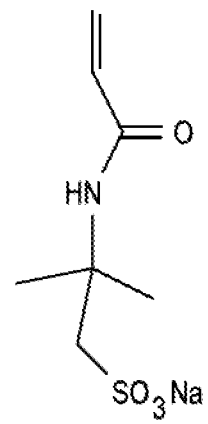
FIG. 2 is a schematic of the chemical structure of p-styrenesulfonate (SSS).

The properties of the monomers influence the properties of the polymer. A water soluble polymer that is stable at high temperatures and high salinities can be synthesized using sulfonated monomers and hydrophobic monomers. In some implementations, the sulfonated monomers include 2-acrylamido-2-methylpropane sulfonic acid (AMPS) in free acid or salified form. FIG. 1 shows the structure of AMPS in salified form. The sulfonated monomers can also include sodium p-styrenesulfonate (SSS). FIG. 2 shows the structure of SSS. The sulfonated monomers in a polymer can prevent the hydrolysis of acrylamide groups, improving the stability of the polymer in high temperature, high salinity environments.

Figure 3:
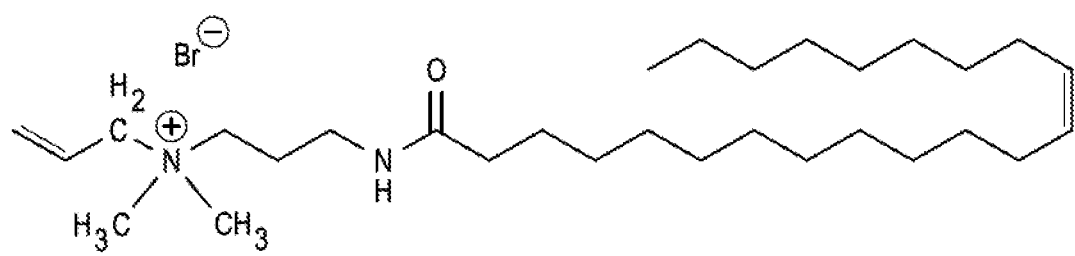
FIG. 3 is a schematic of the chemical structure of erucyl amidopropyl dimethyl allyl ammonium bromide ($C_{22}$DMAAB).

The hydrophobic monomer can be a surfmer. A surfmer, also known as a surface active monomer, is a molecule that functions both as a surfactant and as a monomer capable of polymerization. Surfmers suitable for incorporation into a polymer include modified fatty acids. For example, a fatty acid modified to include an alkene can participate in free radical polymerization. Suitable fatty acids include saturated and unsaturated fatty acids, with 4 to 28 carbons. The fatty acid tail can be branched, unbranched, saturated, or unsaturated in either a cis- or trans-configuration. In some implementations, the surfmer is derived from an ultra-long fatty acid, for example a fatty acid that comprises 18 or more carbons. The properties of the fatty acid tail can influence the properties of the resulting polymer, for example, by influencing the melting point, stability, or solubility of the polymer. In some implementations, the fatty acid surfmer can include a fatty acid that has been modified to include a tertiary cation. The presence of the cation in the surfmer can reduce adsorption in carbonate reservoirs, and improve the stability in high salinity environments, for example in brines that contain high concentrations of divalent ions such as $Ca^{2+}$ and $Mg^{2+}$. The tertiary cation can be functionalized to include a vinyl functional group or other functional group that allows the surfmer to polymerize. For example, erucyl amidopropyl dimethyl allyl ammonium bromide ($C_{22}$DMAAB) can be used as a polymerizable surfmer. FIG. 3 shows the structure of $C_{22}$DMAAB. The $C_{22}$DMAAB monomer, when incorporated into a polymer, increases the aggregation of the polymer and reduces the exposure of the polymer to water. Accordingly, the $C_{22}$DMAAB monomer improves the stability of the polymer in high temperature, high salinity environments.

Figure 4:
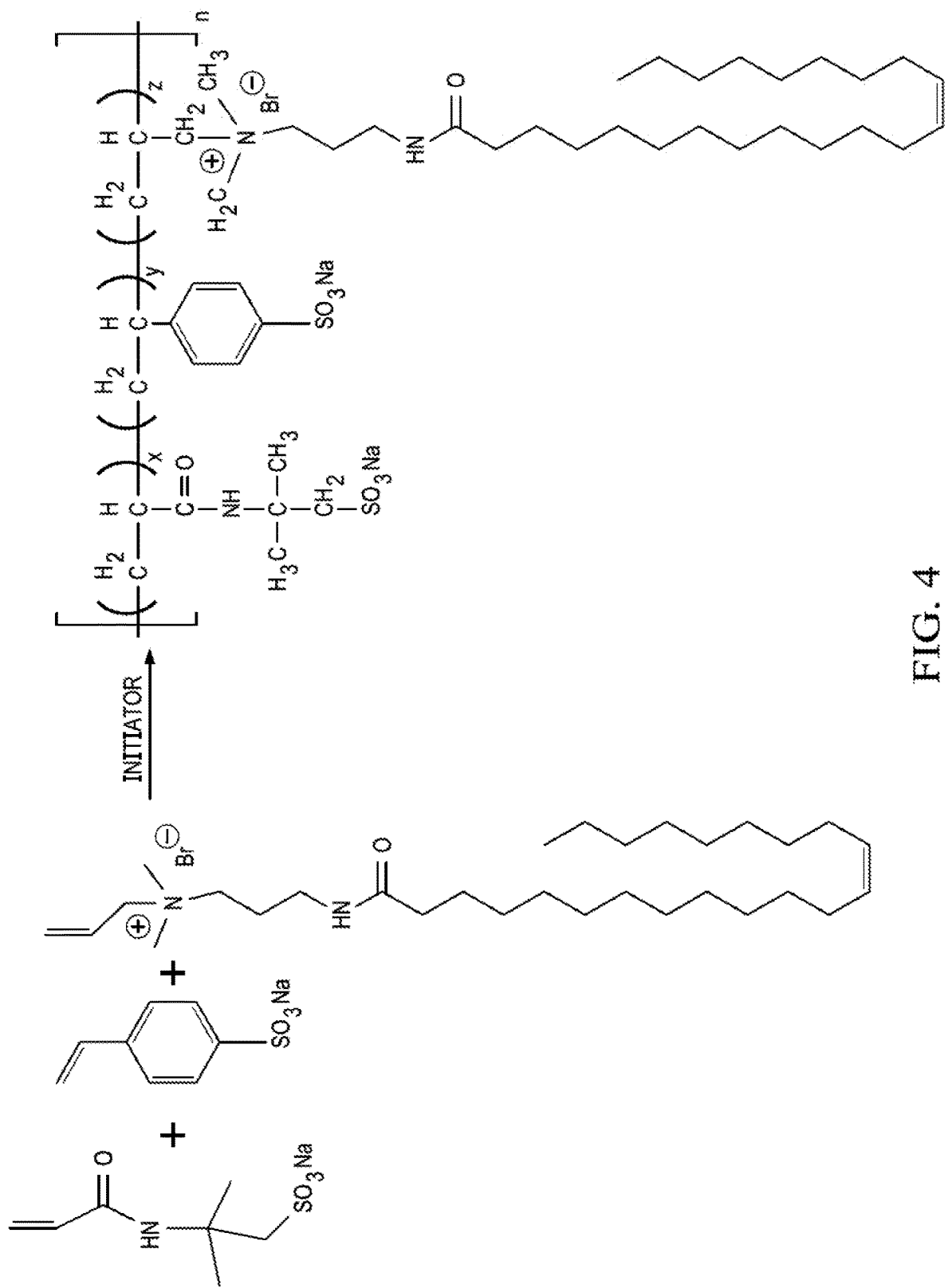
FIG. 4 is a schematic of the reaction between AMPS, SSS, and $C_{22}$DMAAB.

In some implementations, the polymer includes AMPS, SSS, and $C_{22}$DMAAB monomers. The reaction between AMPS, SSS, and $C_{22}$DMAAB is shown in FIG. 4, which yields the AMPS/SSS/$C_{22}$DMAAB copolymer. In FIG. 4, the copolymer is shown where x represents the number of repeats of the AMPS monomer, y represents the number of repeats of the SSS monomer, z represents the number of repeats of the $C_{22}$DMAAB monomer, and n represents the number of repeats of a unit including AMPS, SSS, and $C_{22}$DMAAB. Depending on the reaction conditions, the ratio of x:y:z can be 100: 1-20:0.01-1 and n can be 40-400. FIG. 4 shows the inclusion of one of each of an AMPS, SSS, and $C_{22}$DMAAB monomer in the brackets signifying a repeating unit, however a person skilled in the art will recognize that the polymerization reaction occurs randomly between monomers, accordingly, the polymer is not limited to repeating units containing one of each monomer.

Figure 5:
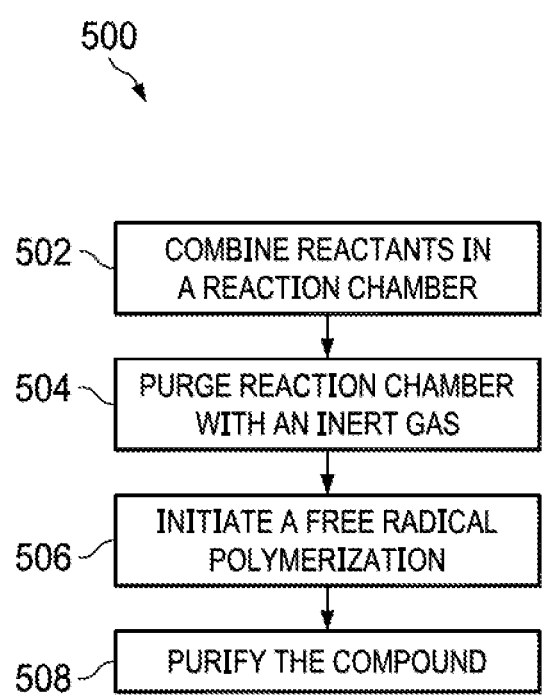
FIG. 5 is an example of a method for synthesizing a copolymer.

An example method 500 is shown in FIG. 5. At block 502, the reactants AMPS, SSS, and $C_{22}$DMAAB are combined in a reaction chamber. At block 504, the chamber is purged with an inert gas. At block 506, a free radical polymerization reaction is initiated. At block 508, the product copolymer compound is purified.

In some implementations, the copolymer is synthesized by preparing a solution of 5-35 wt % AMPS in deionized water at a pH of around 7. Next, SSS and $C_{22}$DMAAB are added to the solution. The mole ratio of AMPS/SSS/$C_{22}$DMAAB can vary. The solution is then purged with nitrogen gas (N2) for 30 minutes to remove oxygen and prevent termination of the polymerization reaction by oxygen. The solution is then heated to between 10-40° C. in a tempering kettle under a nitrogen atmosphere. The initiators are then added to the solution to induce polymerization. The initiators can include $K_2S_2O_8$ and AIBI. After 2-24 hours of polymerization, the final product is purified, for example by precipitation with ethanol followed by drying in a vacuum oven.

EXAMPLES

Test conditions 1-15 investigated the solubility and viscosity of copolymers that include AMP, SSS, and $C_{22}$DMAAB monomers. Solubility was tested in seawater. The composition of the seawater is given in Table 1.

The copolymers were prepared with aqueous free radical copolymerization, as described below, varying mole ratios of AMP, SSS, and $C_{22}$DMAAB. In test solutions 1-7, the mole ratio of AMPS/SSS/$C_{22}$DMAAB was held constant while the amount of the initiating compounds was varied. In test solutions 8-12, the amount of AMPS, $C_{22}$DMAAB, and initiators was constant while the amount of SSS was varied. In test solutions 13-15, the amount of AMPS, SSS, and initiators was constant while the amount of $C_{22}$DMAAB was varied.

Examples 1-7: Copolymerization of
AMPS/SSS/$C_{22}$DMAAB with Varying Amounts of
Initiators In tests 1-7, the copolymers were synthesized with varying amounts of initiators. The reactions were conducted with an AMPS/SSS/$C_{22}$DMAAB mole ratio of 100:2:0.1 at 30° C. The pH of the reaction solutions were around 9 and the concentrations of all monomers were 30 wt %. First, 103.62 g of monomeric AMPS was dissolved in 250 mL of deionized water in a 250 mL flask to a concentration of 30 wt %. $NaHCO_3$ and NaOH were used to adjust the pH to 9. The mixture was stirred for 15 minutes, and 2.062 g of SSS and 0.273 g of $C_{22}$DMAAB were added to the reaction flask. The flask was purged with N2 for 30 minutes. The reactant solution was then heated to 30° C. in a tempering kettle under nitrogen. The initiators $K_2S_2O_8$—$NaHSO_3$ (weight ratio 2/1) and AIBI were added at 0.025-0.1 wt % and 0.0125-0.1 wt %, respectively. The initiator concentrations for tests 1-7 are given in Table 2. The initiated solution was allowed to polymerize for 24 hours. After polymerization, the crude product was purified by precipitation with ethanol and dried in a vacuum oven at 50° C. for 48 hours. For each set of synthetic conditions 1-7, a white polymer powder was recovered.

After synthesis and purification, the copolymer was dissolved in Qurayyah seawater to a concentration of 5000 mg/L at 40° C. The solubility of the copolymer was analyzed using visual inspection. 100 mL seawater was added into a flask, and stirred by magnetic stir at 500 rpm to obtain a good vortex. Then the calculated polymer powder was sprinkled slowly into solution. The solubility time was recorded until there was no insoluble particles observed. After 24 hours, test solutions 1-5 were soluble. Test solutions 6 and 7 exhibited insoluble particles after 24 hours.

The viscosity of solutions 1-7 was analyzed using a Brookfield DVIII viscometer at a shear rate of 7.34 $s^{-1}$. The viscosity was observed at 25° C. and 90° C., and the results are shown in Table 2.

Examples 8-12: Copolymerization of
AMPS/SSS/$C_{22}$DMAAB, with Varying Amounts of
SSS In tests 8-12, the copolymers were synthesized as described above with a varying AMPS/SSS/$C_{22}$DMAAB mole ratio, as given in Table 3, below. The reactions were initiated with the addition of 0.025 wt % $K_2S_2O_8$—$NaHSO_3$ (weight ratio 2/1) and 0.05 wt % at 30° C. The pH of the reaction solutions were around 9 and the concentrations of all monomers were 30 wt %. First, 103.62 g of monomeric AMPS was dissolved in 250 mL of deionized water in a 250 mL flask to a concentration of 30 wt %. $NaHCO_3$ and NaOH were used to adjust the pH to 9. The mixture was stirred for 15 minutes, and 2.062-15.465 g of SSS and 0.273 g of $C_{22}$DMAAB were added to the reaction flask. The flask was purged with N2 for half an hour. The reactant solution was then heated to 30° C. in a tempering kettle under nitrogen. The initiators $K_2S_2O_8$—$NaHSO_3$ (weight ratio 2/1) and AIBI were added at 0.025 wt % and 0.05 wt %, respectively. The initiated solution was allowed to polymerize for 24 hours. After polymerization, the crude product was purified by precipitation with ethanol and dried in a vacuum oven at 50° C. for 48 hours. For each set of synthetic conditions 8-12, a white polymer powder was recovered.

After synthesis and purification, the copolymer was dissolved in Qurayyah seawater to a concentration of 5000 mg/L at 40° C. The solubility of the copolymer was analyzed using visual inspection. After 24 hours, each test solution 8-12 was soluble. The viscosity of solutions 8-12 was analyzed using a Brookfield DVIII viscometer at a shear rate of 7.34 $s^{-1}$. The viscosity was observed at 25° C. and 90° C., and the results are shown in Table 3. The solubility of the copolymer in seawater was improved by increasing the mole ratio of the SSS monomer within the copolymer.

Examples 13-15: Copolymerization of
AMPS/SSS/$C_{22}$DMAAB, with Varying Amounts of
$C_{22}$DMAAB In tests 13-15, the copolymers were synthesized as described above with a varying AMPS/SSS/$C_{22}$DMAAB mole ratio, as given in Table 4, below. The reactions were initiated with the addition of 0.025 wt % $K_2S_2O_8$—$NaHSO_3$ (weight ratio 2/1) and 0.05 wt % at 30° C. The pH of the reaction solutions were around 7 and the concentrations of all monomers were 30 wt %. First, 103.62 g of monomeric AMPS was dissolved in 250 mL of deionized water in a 250 mL flask to a concentration of 30 wt %. NaHCO$_3$ and NaOH were used to adjust the pH to 7. The mixture was stirred for 15 minutes, and 2.062 g of SSS and 0.1365-0.546 g of C$_{22}$DMAAB were added to the reaction flask. The flask was purged with N2 for half an hour. The reactant solution was then heated to 30° C. in a tempering kettle under nitrogen. The initiators K$_2$S$_2$O$_8$—NaHSO$_3$ (weight ratio 2/1) and AIBI were added at 0.025 wt % and 0.05 wt %, respectively. The initiated solution was allowed to polymerize for 24 hours. After polymerization, the crude product was purified by precipitation with ethanol and dried in a vacuum oven at 50° C. for 48 hours. For each set of synthetic conditions 13-15, a white polymer powder was recovered.

After synthesis and purification, the copolymer was dissolved in Qurayyah seawater to a concentration of 5000 mg/L at 25° C. The solubility of the copolymer was analyzed using visual inspection. After 24 hours, test solution 15 was soluble, and test solutions 13 and 14 exhibited particles after 24 hours. The viscosity of solutions 13-15 was analyzed using a Brookfield DVIII viscometer at a shear rate of 7.34 s$^{-1}$. The viscosity was observed at 25° C. and 90° C., and the results are shown in Table 4.

Example 16: Large-Scale Synthesis of AMPS/SSS/C$_{22}$DMAAB

A large-scale synthesis of the copolymers is described in Example 16. 341.95 g of AMPS was dissolved in 878 g of deionized water in a 2000 mL flask. NaHCO$_3$ and NaOH were added to adjust the pH to about 7. The solution was then stirred for 15 minutes. 34.02 g of SSS and 4.5 g of C$_{22}$DMAAB was added to the flask. The flask was purged with N2 for 2 hours. The solution was then heated to 30° C. in a tempering kettle under a nitrogen atmosphere. The initiators K$_2$S$_2$O$_8$—NaHSO$_3$ (weight ratio 2/1) and AIBI were added at 0.025 wt % and 0.05 wt %, respectively. The initiated solution was allowed to polymerize for 24 hours. The copolymer was then purified by precipitation with ethanol and dried in a vacuum oven at 40° C. for 48 hours. The purified product was dissolved at room temperature in seawater. After 2 hours, the copolymer was completely dissolved. The viscosity of the solution was measured at 25° C. and 90° C. using a Brookfield DVIII viscometer at a shear rate of 7.34 s$^{-1}$. The results are shown in Table 5. The viscosity of this solution reached up to 22.5 mPa at 25° C.

Example 17: Characterization of Copolymer AMPS/SSS/C$_{22}$DMAAB

Figure 6:
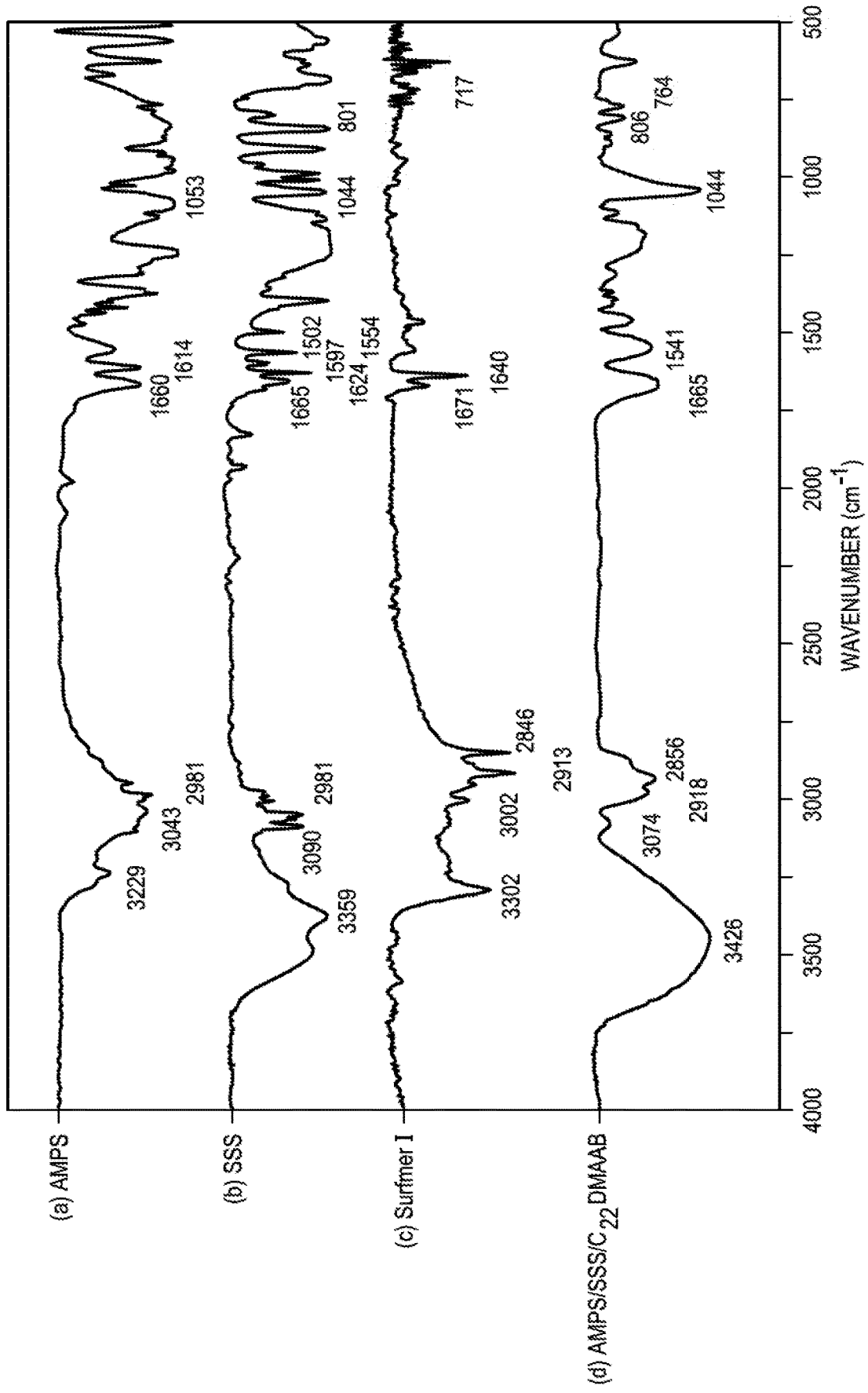
FIG. 6 shows an example infrared (IR) spectra of AMPS, SSS, $C_{22}$DMAAB, and a AMPS/SSS/$C_{22}$DMAAB copolymer.

Infrared spectroscopy was used to confirm the structure of the AMPS/SSS/C$_{22}$DMAAB copolymers as synthesized in Example 16. FIG. 6 shows an example IR spectra of the individual monomers AMPS (curve a), SSS (curve b), C$_{22}$DMAAB (curve c), and the AMPS/SSS/C$_{22}$DMAAB copolymer (curve d). The wide absorption at 3425 cm$^{-1}$ as seen in curve (d) is due to the N—H stretching vibration. The absorption at 3074 cm$^{-1}$ as seen in curve (d) is due to the stretching vibration of —C=C—H in aromatic rings. The peaks at 2918 cm$^{-1}$ and 2856 cm$^{-1}$ as seen in curve (d) are the stretching vibrations of the —CH$_3$ and —C—H(—CH$_2$—) groups. The peak at 1665 cm$^{-1}$ as seen in curves (c) and (d) is the —C=O stretching vibration. The absorption band at 1541 cm$^{-1}$ and 806 cm$^{-1}$ as seen in curve (b) and (d) corresponds to the —HC=CH— stretching vibration and bending vibration in the aromatic rings. The characteristic peak of —SO$_3$Na is observed at 1044 cm$^{-1}$ in curve (a), curve (b) and curve (d). The above peaks are all present in curve d, which represents the copolymer. Accordingly, all three monomers are present in the copolymer. Further, there are no alkene double bonds remaining in the copolymer, as evidenced by the absence of the characteristic carbon-carbon double bond peaks at 1650-1600 cm$^{-1}$.

Example 18: Thermal Gravimetric Analysis

Figure 7:
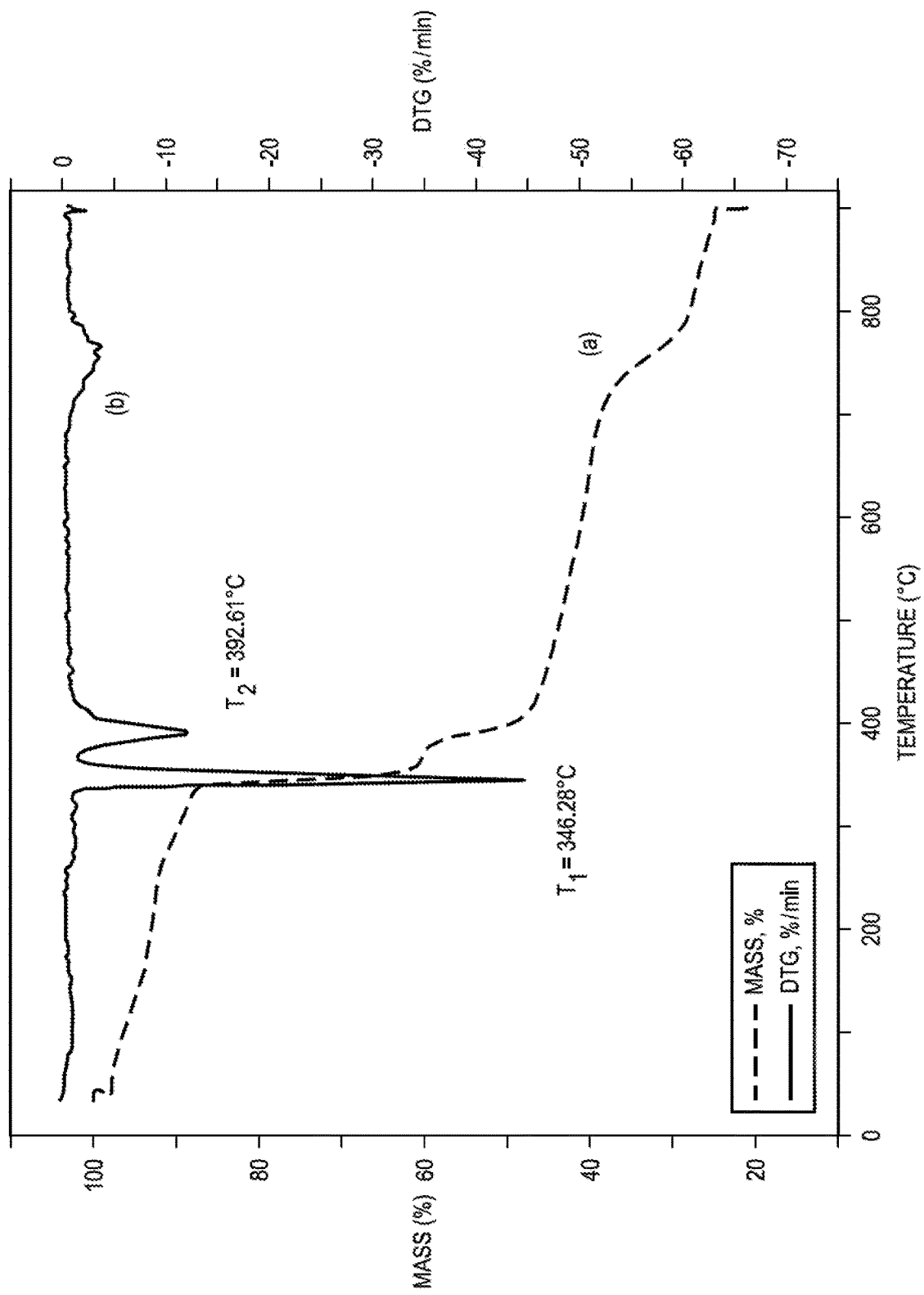
FIG. 7 shows an example thermal gravimetric analysis of a copolymer.

Thermal gravimetric analysis (TGA) was used to determine the thermal stability of the copolymer as synthesized in Example 16. FIG. 7 shows the mass of the copolymer as a function of temperature. The initial temperature of the sample in the thermal gravimetric analysis was 40° C. and the sample was heated to 650° C. with a heating rate of 10° C./min. The temperatures that correspond to T$_{15}$ (15% weight loss) and T$_{20}$ (20% weight loss), are shown in Table 6. A polymer that has a T$_{15}$ above 300° C. and a T$_{20}$ above 320° C. can be considered to have good thermal stability at harsh conditions. In FIG. 7, the TGA curve (a) of the copolymer shows three main steps of weight loss. The first derivative of the TGA curve, the derivate plot of the TGA curve (DTG) curve (b), illustrates the inflection points of the TGA curve that indicate a weight-loss step. In the first weight loss step (below 200° C.), the weight loss is about 6.62%, which can be attributed to the evaporation of moisture. The copolymer has hydrophilic groups that can be easily hydrated. The second weight loss step occurs between 200° C. and 350° C., where the weight loss is approximately 7.34% is observed. This can be attributed to the decomposition of sulphonic acid groups. In the third weight-loss step (above 350° C.), there is a sharp weight loss due to the combustion of the copolymer. The TGA analysis illustrates that the AMPS/SSS/C$_{22}$DMAAB copolymer has good stability at high temperatures.

Example 19: Molecular Weight Distribution Analysis of the AMPS/SSS/C$_{22}$DMAAB Copolymer The copolymer as synthesized in Example 16 was analyzed using gel permeation chromatography (GPC) with infrared (RID) and light scattering (LSD) detectors. The absolute molecular weight was calculated using RID and LSD signals. Viscosity-averaged molecular weight (M$_v$) was obtained using a viscosity detector.

An Agilent 1260 chromatography system was used for characterization of polymers. The equipment was coupled with a refractive index detector (RID), a light scattering detector (LSD) and a viscosity detector (VD). The PL aquagel-OH column (Mw range 1000 to >10,000,000) made of hydroxylated polyacrylamide and TSK GWPxl made of hydroxylated poly(methyl methacrylate) was used. The temperature of column and detector were both set at 45° C. The calibration of the equipment was applied with a standard polyethylene oxide (PEO) sample with Mw 71,250 Da. The characteristics remained essentially unchanged after 1 year of operation. The mobile phase used in GPC analysis was composed of NaH$_2$PO$_4$, formamide and acetate ammonium. Temperature of GPC column and detectors were all set at 45° C. In the calculation of molecular weight of the polymers, dn/dc value was set at 0.163. All the samples were diluted to an appropriate concentration by GPC mobile phase and stirred overnight to ensure complete dilution before analysis.

Table 7 lists the molecular weight of the copolymer, Mw, the viscosity-averaged molecular weight (My), the number average molar mass (Mn), and the polydispersity index (PDI). As shown in Table 7, the molecular weight of the copolymer is 8.32 MDa, the viscosity-averaged molecular weight is 8.99 MDa, the number average molar mass is 7.20 MDa, and the polydispersity index is 1.16.

Example 20: Viscometric Properties of Synthesized Copolymer

The viscosity of the copolymer prepared in the large-scale synthesis in Example 16 was measured as a function of concentration. Polymer solutions were prepared by the slow addition of the copolymer powder in seawater, with stirring at 500 rpm for 30 minutes. The composition of the seawater can be found in Table 1. After 30 minutes, the stirring speed was reduced to 200 rpm to avoid mechanical degradation of the copolymer. The solutions were kept at room temperature without stirring for another 24 hours to ensure that the copolymers were fully hydrated. The apparent viscosities of the copolymer solutions were measured using a Brookfield DVIII viscometer at a shear rate of 7.34 $s^{-1}$.

Figure 8:
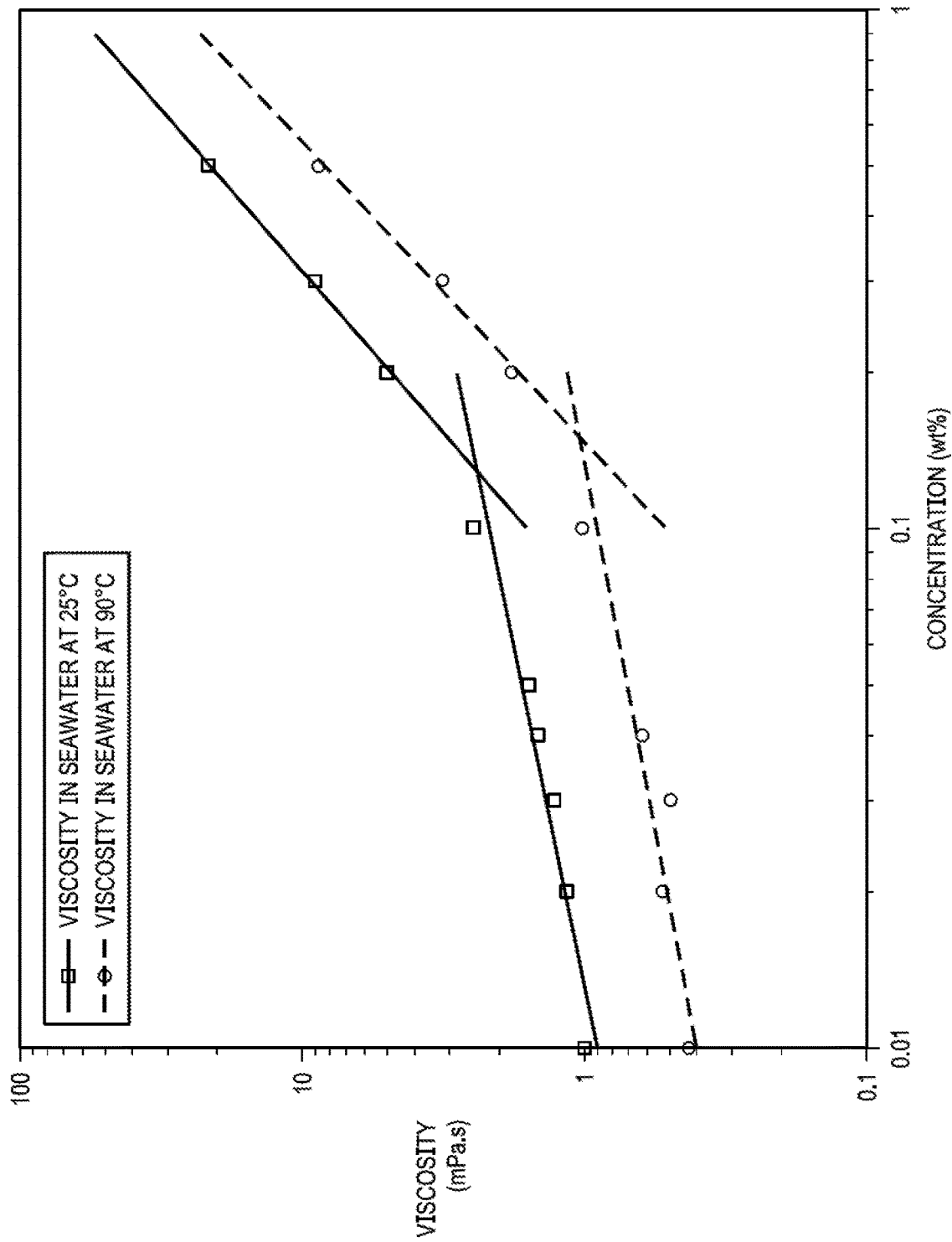
FIG. 8 shows the viscosity of a copolymer solution as a function of concentration at 25° C. and 90° C.

As the concentration of the copolymer in solution increases, the solution transitions from a dilute regime, where the individual polymer molecules can be considered independent entities, to a semi-dilute regime, where the polymers begin to interpenetrate. FIG. 8 shows the viscosity of the solution as a function of concentration at 25° C. and 90° C. The concentration at which the solution transitions from a dilute to a semi-dilute regime, C*, was calculated from the breakpoint in the curve. Table 8 shows the C* values for to large-scale synthesized copolymer at 25° C. and 90° C.

Example 21: Effect of Shear Rate on Viscosity

Figure 9:
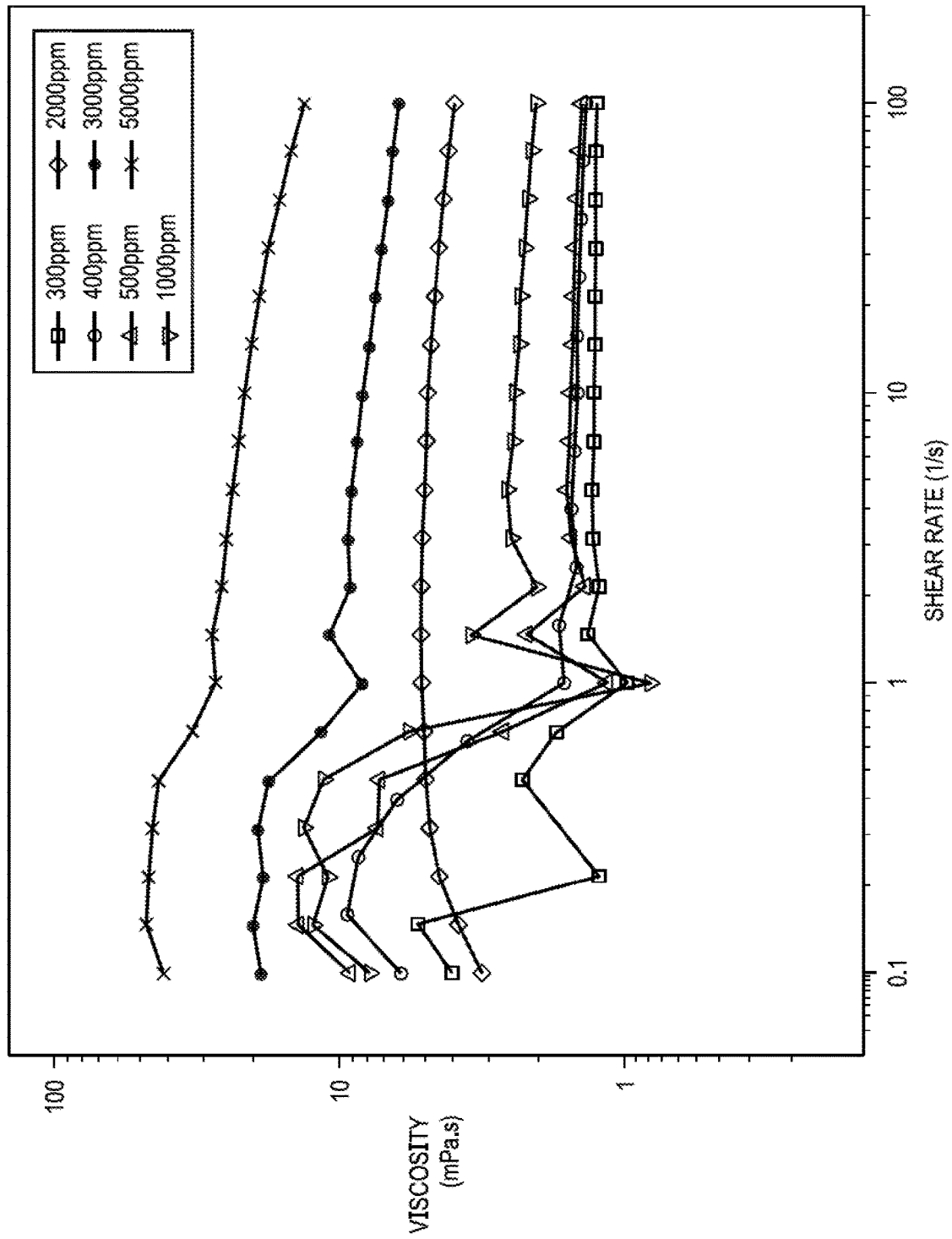
FIG. 9 shows the viscosity of a copolymer as a function of shear rate at 25° C.
Figure 10:
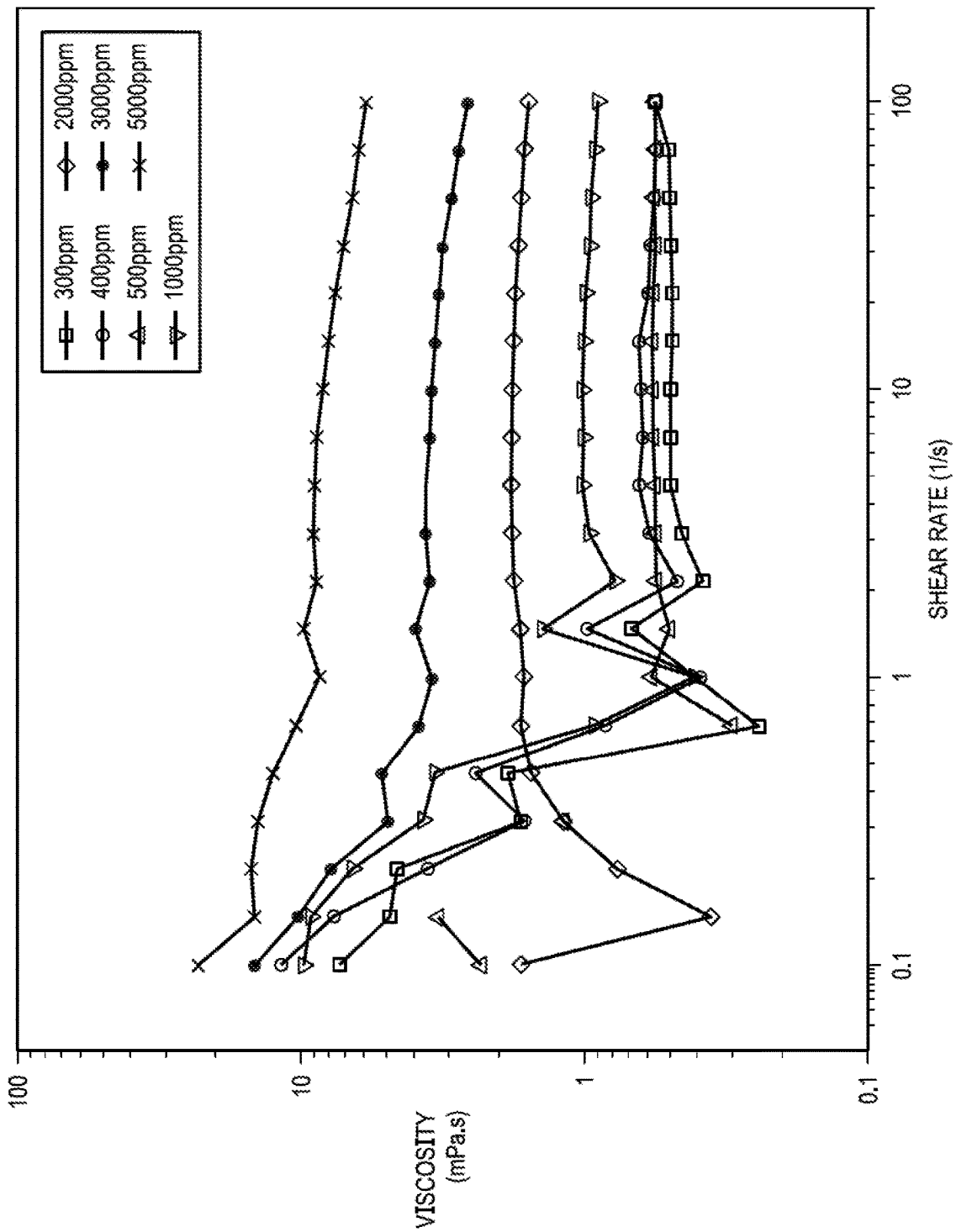
FIG. 10 shows the viscosity of a copolymer as a function of shear rate at 90° C.

FIG. 9 and FIG. 10 show the viscosity of the AMPS/SSS/$C_{22}$DMAAB copolymer as synthesized in Example 16, in seawater, as a function of shear rate. The viscosity was measured using a Brookfield DVIII viscometer with varying shear rate. The viscosity as a function of shear rate was measured at 25° C. (FIG. 9) and 90° C. (FIG. 10). As shown in these figures, viscosity increases with increasing concentration and decreases with increasing shear rate. The AMPS/SSS/$C_{22}$DMAAB copolymer shows an initial drop in viscosity as shear rate increases, but is stable even at the highest shear rates analyzed.

Example 22: Effect of Temperature on Viscosity

Figure 11:
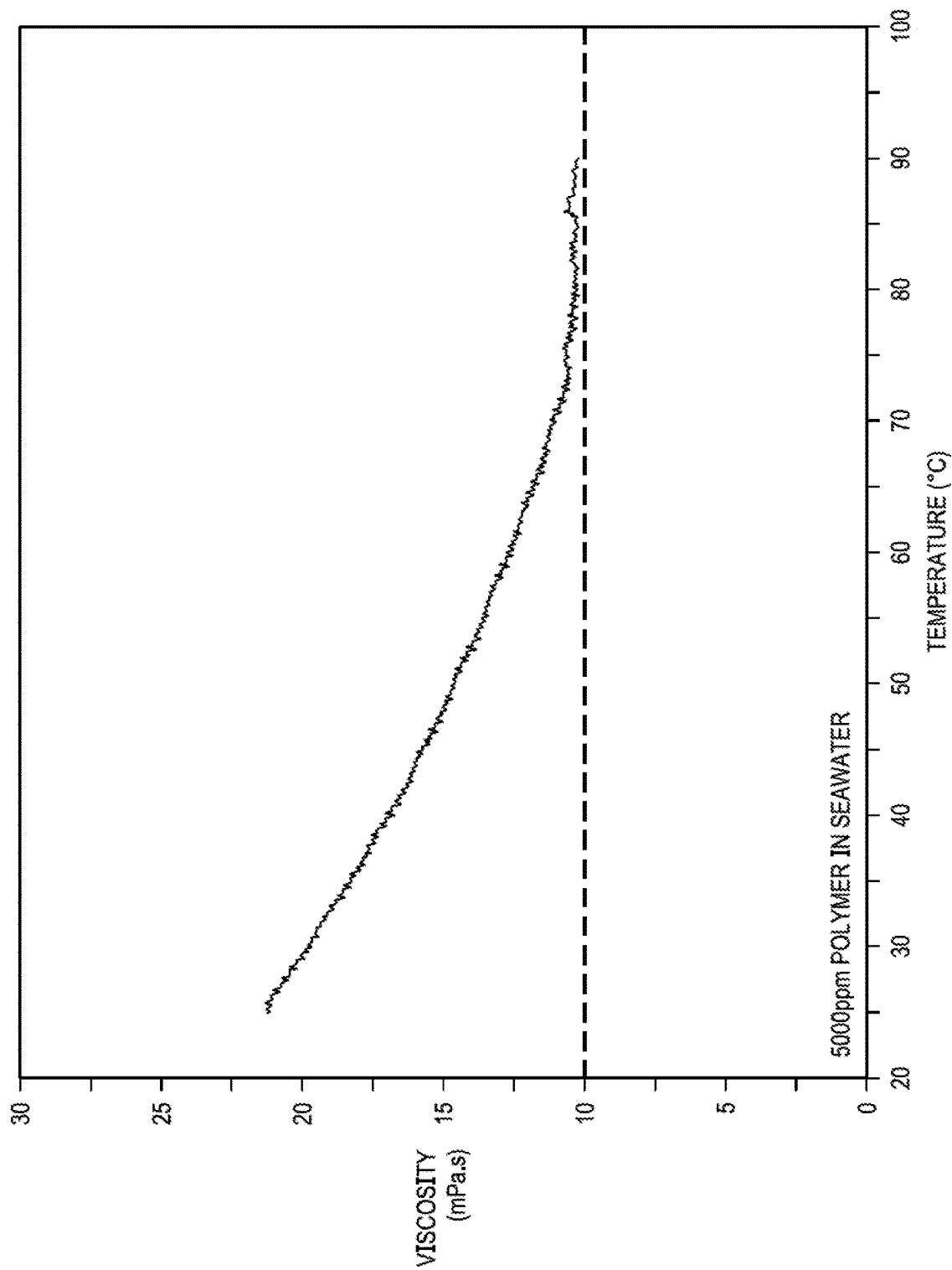
FIG. 11 shows the viscosity of a copolymer as a function of temperature.

FIG. 11 shows the viscosity of the AMPS/SSS/$C_{22}$DMAAB copolymer as a function of temperature. The copolymer was synthesized as in Example 16 and was dissolved in seawater at a concentration of 5000 ppm. The viscosity was measured using a Brookfield DVIII viscometer with a shear rate of 7.34 $s^{-1}$. As shown in FIG. 11, the viscosity of the copolymer decreased with temperature but remained above 10 mPa s, even at high temperatures. Table 9 lists the viscosity of AMPS/SSS/$C_{22}$DMAAB at 25° C. and 90° C.

Example 23: Injectivity of Synthesized Copolymer

The injectivity of the copolymer as prepared in Example 16 was analyzed by measuring the filter ratio. Filter ratio is a measure of the injectivity of copolymer solutions. A filter ratio of less than 1.2 is considered injectable for the purposes of subterranean formations, reservoirs and wellbores. The filter ratio of the AMPS/SSS/$C_{22}$DMAAB copolymer was measured using an SNF Filter Ratio Apparatus. 400 mL of copolymer solution containing 500 ppm synthesized copolymer was loaded into the SNF apparatus and filtered using a 5.0 μm filter membrane (Whatman filters) under a gas pressure of 207 kPa (30 psi), using compressed air. The time points at which every 100 mL of solution passed through the membrane were recorded at $t_{100\ mL}$, $t_{200\ mL}$, and $t_{300\ mL}$. The filtration ratio was calculated using Equation 1:

$$\text{Filter Ratio} = \frac{t_{300\ mL} - t_{200\ mL}}{t_{200\ mL} - t_{100\ mL}} \qquad \text{Eq. 1}$$

For the copolymer synthesized in Example 16, the filtration ratio was 1.1, indicating good injectivity.

Example 24: Static Adsorption of Synthesized Copolymer

The static adsorption of the copolymer sample prepared in Example 16 was measured by measuring the adsorption of the copolymer to carbonate cores. 1 gram of 60 to 80 mesh crushed carbonate cores was mixed with 5 mL of copolymer solution of 5000 ppm in a 30 mL bottle. The carbonate cores and copolymer solution were mixed with shaking. The mixture was placed in a 95° C. oven for 24 hours, with additional shaking after 1 hour. After 24 hours in the oven, the mixture was centrifuged at 3000 rpm for 30 minutes to separate the aqueous solution from the carbonate cores. The copolymer concentration in the aqueous solution was analyzed using a Total Organic Carbon (TOC) analyzer. The amount of adsorption was quantified by mass balance using Equation 2:

$$C_a = \frac{(C_i - C_f)V}{m_s} \qquad \text{Eq. 2}$$

where $C_a$ is the polymer adsorption quantity in mg/g, $C_i$ is the initial concentration of the polymer solution in mg/L, V is the volume of the polymer solution used in liters, $C_f$ is the polymer concentration remaining in the solution after adsorption in mg/L, and $m_s$ is the mass of carbonate cores in grams. For a concentration of 5000 ppm of copolymer, the initial concentration $C_i$ was 4995 mg/L, the final concentration $C_f$ was 4861, and the copolymer adsorption quantity $C_a$ was 0.67 mg/g.

Example 25: Dynamic Adsorption

The dynamic adsorption of the AMPS/SSS/$C_{22}$DMAAB copolymer as synthesized in Example 16 was investigated. The polymer solutions were filtered by gravity through 8 μm Whatman filter before use to ensure the accuracy. AFS300 coreflooding system from Corelab System was used for the dynamic adsorption tests. The process includes saturating the core with connate water, injecting seawater for 5 pore volume (PV) equivalents, setting the temperature at 99° C. and pore pressure at 3100 psi, and injecting the polymer solution at 0.5 cc/min for 5 PV The process also includes collecting the effluent in tubes, injecting seawater at 0.5 cc/min for at least 5 PV to displace the free polymer in pores, and collecting the effluent in tubes.

Figure 12:
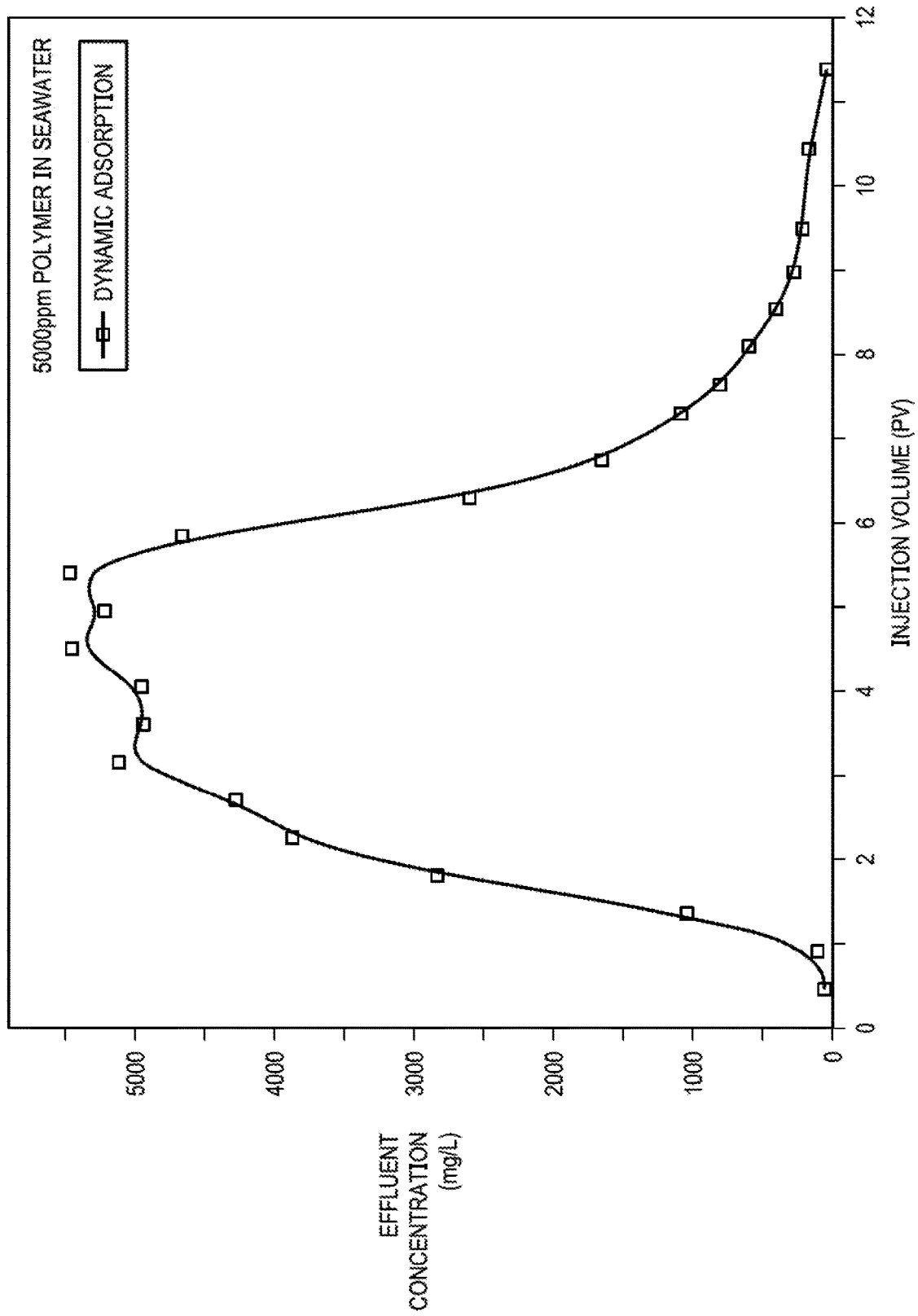
FIG. 12 shows the dynamic adsorption curve and effluent concentration of a copolymers as a function of injection volume.

Polymer concentration in the effluent was determined by TOC method. The dynamic adsorption of polymer was calculated by material balance using the following formulation:

$$\Gamma_{ads} = \frac{m_{inj} - m_{prod}}{m_{core}} = \frac{V_{inj}C_{inj} - \sum_{i=1}^{n}(V_iC_i)}{m_{core}}, \quad \text{Eq. 3}$$

where $\Gamma_{ads}$ is chemical adsorption on unit mass of rock, mg/g-rock; $m_{inj}$ is the mass of chemical injected into the core in mg; $m_{prod}$ is mass of chemical produced from the core in mg; $m_{core}$ is the mass of the dry core plug; $V_{inj}$ is the injection volume of the chemical in L; $C_{inj}$ is the concentration of injection chemical in mg/L; $V_i$ is the volume of the effluent in the tube in L; and $C_i$ is the concentration of the effluent in the tube. The test conditions of the experiment are listed in Table 10. The dynamic adsorption curve, effluent concentration as a function of injection volume, is shown in FIG. 12. The dynamic adsorption of the copolymer was 0.13 mg/g.

Example 26: Long-term Stability of Copolymer Solutions at Harsh Conditions

The stability of the copolymer synthesized in Example 16 was monitored by measuring the variation of viscosity with time. Copolymer solutions of 5000 ppm were prepared and transferred to a glovebox, where the copolymer solutions were bubbled with nitrogen for 4 hours to remove any dissolved $O_2$. The dissolved oxygen concentration in the copolymer solution, as measured with CHEMET in the glove box, was less than 10 ppb.

Figure 13:
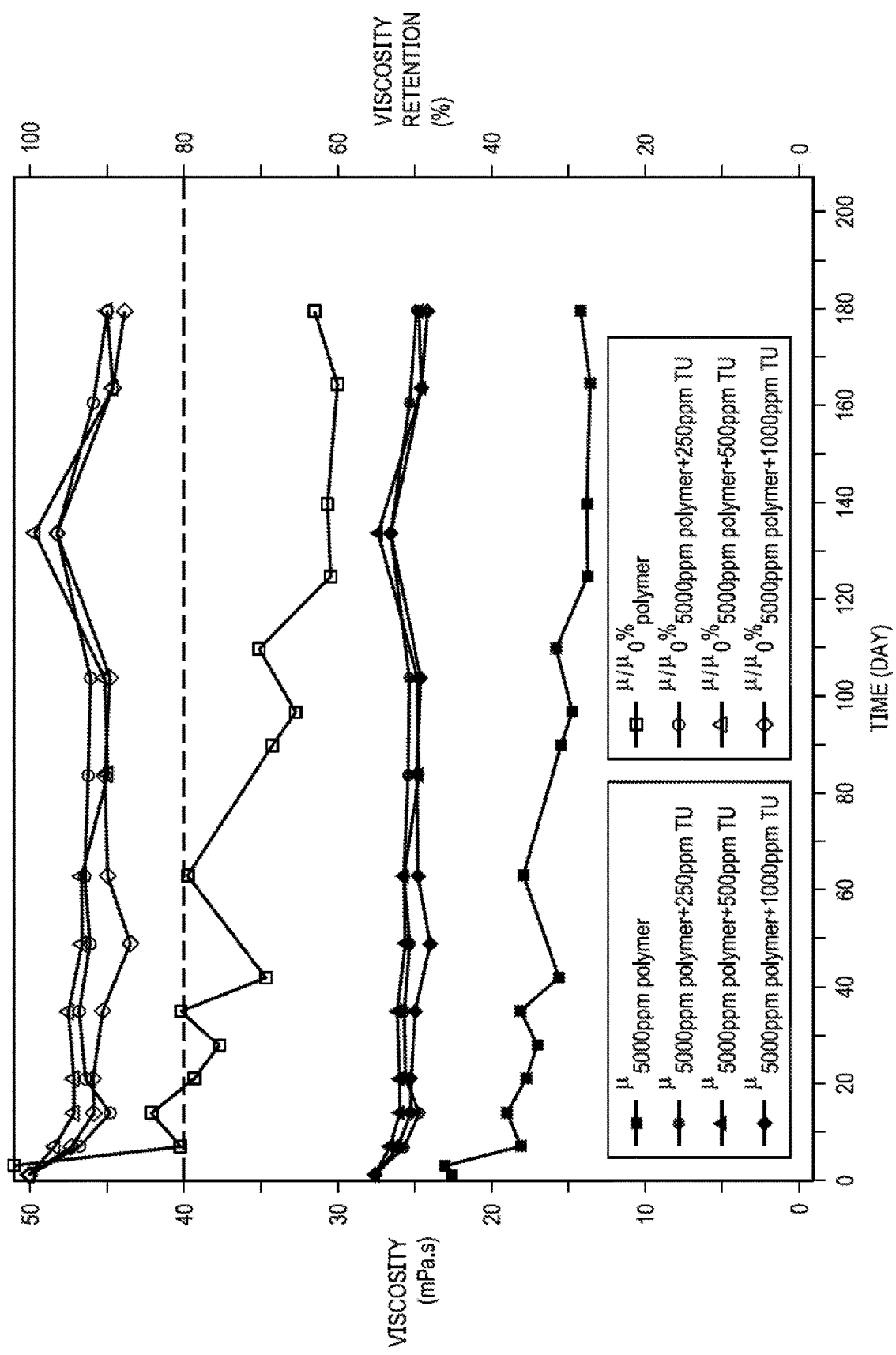
FIG. 13 shows the viscosity of copolymers as a function of concentration, stabilizer, and time.

25 mL of the copolymer solution were then placed into 50 mL bottles and sealed. The bottles were placed into an oven at 95° C., and the viscosity of the copolymer was measured at different time points. Viscosity was measured at 25° C. using a Brookfield DVIII viscometer with a shear rate of 7.34 $s^{-1}$. As shown in FIG. 13, the viscosity of the copolymer (open square data points) is sharply reduced during the first week of high temperature conditions. After the first seven days, the viscosity of the copolymer reduces slowly but shows good stability. There was no precipitation formed during the test and the viscosity retention of the copolymer after 180 days was around 63%, indicating that the copolymer is stable even under harsh conditions.

The commercial stabilizer thiourea (TU) was utilized to further enhance the stability of the copolymer. The viscosity retention rate of the copolymer with different concentrations of TU was also investigated. The results of the TU stability tests are shown in Table 11. Solutions with 250 ppm TU, 500 ppm TU, and 1000 ppm TU all showed improved viscosity retention to around 90% for the 180 day long-term stability test. Even the smallest amount of TU, 250 ppm, resulted in a notable increase in stability. Accordingly, TU is a compatible stabilizer for use with the copolymer, for example during EOR at high temperature and high salinity conditions.

TABLE 1

Seawater Composition

| Seawater | Cations | | | Anions | | | Total salinity |
|---|---|---|---|---|---|---|---|
| | $Na^+$ | $Ca^{2+}$ | $Mg^{2+}$ | $Cl^-$ | $HCO_3^-$ | $SO_4^{2-}$ | |
| Concentration (ppm) | 18,300 | 659 | 2,110 | 32,200 | 120 | 4,290 | 57,670 |

TABLE 2

Copolymers in Tests 1-7

| Test No. | mole ratio | | | Initiator (wt %) | | Temp. (° C.) | Conc. (wt %) | pH | Solubility in seawater (hr) | Viscosity (mPa · s) | |
|---|---|---|---|---|---|---|---|---|---|---|---|
| | AMPS | SSS | $C_{22}$DMAAB | $K_2S_2O_8$—NaHSO$_3$ | AIBI | | | | | 25° C. | 90° C. |
| 1 | 100 | 2 | 0.1 | 0.1 | 0.1 | 30 | 30 | 9 | 24 | 45 | 25 |
| 2 | 100 | 2 | 0.1 | 0.05 | 0.1 | 30 | 30 | 9 | 24 | 50.67 | 28.93 |
| 3 | 100 | 2 | 0.1 | 0.05 | 0.05 | 30 | 30 | 9 | 24 | 65.07 | 29.77 |
| 4 | 100 | 2 | 0.1 | 0.05 | 0.025 | 30 | 30 | 9 | 24 | 69.85 | 52.60 |
| 5 | 100 | 2 | 0.1 | 0.025 | 0.05 | 30 | 30 | 9 | 24 | 72.16 | 30.07 |
| 6 | 100 | 2 | 0.1 | 0.025 | 0.025 | 30 | 30 | 9 | Existing particles after 24 hr | 73.26 | 57.92 |
| 7 | 100 | 2 | 0.1 | 0.025 | 0.0125 | 30 | 30 | 9 | | 117.56 | 107.48 |

TABLE 3

Copolymers in Tests 8-12.

| Test No. | mole ratio | | | Initiator (wt %) | | Temp. (° C.) | Conc. (wt %) | pH | Solubility in seawater at 40° C. (hr) | Viscosity (mPa · s) | |
|---|---|---|---|---|---|---|---|---|---|---|---|
| | AMPS | SSS | $C_{22}$DMAAB | $K_2S_2O_8$—NaHSO$_3$ | AIBI | | | | | 25° C. | 90° C. |
| 8 | 100 | 2 | 0.1 | 0.025 | 0.05 | 30 | 30 | 9 | 24 | 45 | 25 |
| 9 | 100 | 5 | 0.1 | 0.025 | 0.05 | 30 | 30 | 9 | 15 | 47.7 | 23.5 |
| 10 | 100 | 7 | 0.1 | 0.025 | 0.05 | 30 | 30 | 9 | 7 | 36.5 | 15.1 |
| 11 | 100 | 10 | 0.1 | 0.025 | 0.05 | 30 | 30 | 9 | 5 | 30.5 | 12.6 |
| 12 | 100 | 15 | 0.1 | 0.025 | 0.05 | 30 | 30 | 9 | 5 | 20.5 | 7.6 |

TABLE 4

Copolymers in Tests 13-15

| Test No. | mole ratio AMPS | SSS | C$_{22}$DMAAB | Initiator (wt %) K$_2$S$_2$O$_8$—NaHSO$_3$ | AIBI | Temp. (° C.) | Conc. (wt %) | pH | Solubility in seawater at 25° C. (hr) | Viscosity (mPa · s) 25° C. | 90° C. |
|---|---|---|---|---|---|---|---|---|---|---|---|
| 13 | 100 | 10 | 0.2 | 0.025 | 0.05 | 30 | 30 | 7 | Existing particles after 24 hr | 47 | 27 |
| 14 | 100 | 10 | 0.1 | 0.025 | 0.05 | 30 | 30 | 7 |  | 30.5 | 12.6 |
| 15 | 100 | 10 | 0.05 | 0.025 | 0.05 | 30 | 30 | 7 | 2 | 20 | 10 |

TABLE 5

Large Scale Synthesis of AMPS/SSS/C$_{22}$DMAAB Copolymer.

| Test No. | mole ratio AMPS | SSS | C$_{22}$DMAAB | Initiator (wt %)$^a$ K$_2$S$_2$O$_8$—NaHSO$_3$ | AIBI | Temp. (° C.) | Conc. (wt %) | pH | Time (hr) | Viscosity (mPa · s) 25° C. | 90° C. |
|---|---|---|---|---|---|---|---|---|---|---|---|
| 16 | 100 | 10 | 0.05 | 0.025 | 0.05 | 30 | 30 | 7 | 24 | 22.5 | 10.2 |

TABLE 6

T$_{15}$ and T$_{20}$ of AMPS/SSS/C$_{22}$DMAAB Copolymer

| Sample | T$_{15}$ | T$_{20}$ |
|---|---|---|
| AMPS/SSS/C$_{22}$DMAAB | 342.18 | 344.24 |

TABLE 7

Molecular weight of synthesized copolymer AMPS/SSS/C$_{22}$DMAAB

| Sample | M$_w$ (MDa) | M$_v$ (MDa) | M$_n$ (MDa) | PDI |
|---|---|---|---|---|
| AMPS/SSS/C$_{22}$DMAAB | 8.32 | 8.99 | 7.20 | 1.16 |

TABLE 8

C* values for AMPS/SSS/C$_{22}$DMAAB copolymer

| Polymer | C* (ppm) 25° C. | 90° C. |
|---|---|---|
| AMPS/SSS/C$_{22}$DMAAB | 1293.81 | 1512.79 |

TABLE 9

Viscosity of copolymer AMPS/SSS/C$_{22}$DMAAB at 25° C. and 90° C.

| AMPS/SSS/C$_{22}$DMAAB | 25° C. | 90° C. |
|---|---|---|
| Viscosity (mPa · s) | 22.52 | 10.21 |

TABLE 10

Test conditions of dynamic adsorption

| Copolymer | Core No. | Temperature, (° C.) | Pore pressure (psi) | Confining pressure (psi) |
|---|---|---|---|---|
| AMPS/SSS/C$_{22}$DMAAB | 98 | 99 | 3100 | 4500 |

TABLE 11

Long-term stability results of synthesized copolymer with different additions of TU

| Sample Name | Viscosity (mPa · s) Day 1 | Day 90 | Day 180 | τ | T$_{1/2}$ (day) |
|---|---|---|---|---|---|
| AMPS/SSS/C$_{22}$DMAAB | 22.52 | 15.41 | 14.17 | 400 | 277.20 |
| AMPS/SSS/C$_{22}$DMAAB + 250 ppm TU | 27.50 | 25.40 | 25.2 | 5000 | 3465 |
| AMPS/SSS/C$_{22}$DMAAB + 500 ppm TU | 27.50 | 24.80 | 24.50 | 2500 | 1732 |
| AMPS/SSS/C$_{22}$DMAAB + 1000 ppm TU | 27.50 | 24.60 | 24.50 | 3333 | 2310 |

In some implementations, a composition includes a compound of the formula

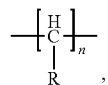

where n is 40-400 and at each instance R is independently selected from the group consisting of R$_1$, R$_2$ and R$_3$, and where $R_1$ is

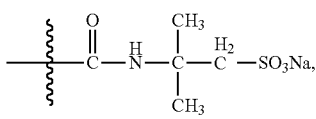

$R_2$ is

and
$R_3$ is

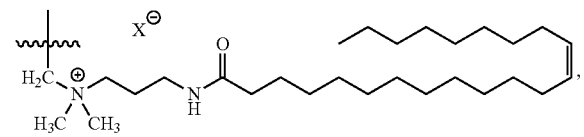

and where X is halide.

This aspect, taken alone or combinable with any other aspect, can include the following features. The mole ratio of $R_1$ to $R_2$ to $R_3$ is 100 moles $R_1$ to 2-15 moles $R_2$ to 0.05-0.2 moles $R_3$.

This aspect, taken alone or combinable with any other aspect, can include the following features. The mole ratio of $R_1$ to $R_2$ to $R_3$ is 100 moles $R_1$ to 2 moles $R_2$ to 0.1 moles $R_3$.

This aspect, taken alone or combinable with any other aspect, can include the following features. The mole ratio of $R_1$ to $R_2$ to $R_3$ is 100 moles $R_1$ to 10 moles $R_2$ to 0.05 moles $R_3$.

This aspect, taken alone or combinable with any other aspect, can include the following features. The compound has a $T_{15}$ value as measured by thermal gravimetric analysis that is greater than 300° C.

This aspect, taken alone or combinable with any other aspect, can include the following features. The compound has a $T_{20}$ value as measured by thermal gravimetric analysis that is greater than 320° C.

This aspect, taken alone or combinable with any other aspect, can include the following features. The compound has a molecular weight of 1-10 MDa.

This aspect, taken alone or combinable with any other aspect, can include the following features. The compound has a viscosity averaged molecular weight of the compound is 1-10 MDa.

This aspect, taken alone or combinable with any other aspect, can include the following features. The compound has a number average molar mass of 40-400 MDa.

This aspect, taken alone or combinable with any other aspect, can include the following features. The compound has a polydispersity index of 1-3.

This aspect, taken alone or combinable with any other aspect, can include the following features. The compound has a C* value of about 1290 at 25° C.

This aspect, taken alone or combinable with any other aspect, can include the following features. The compound has a C* value of about 1510 at 90° C.

This aspect, taken alone or combinable with any other aspect, can include the following features. The compound has a viscosity of greater than 20 mPa s at 25° C.

This aspect, taken alone or combinable with any other aspect, can include the following features. The compound has a viscosity of greater than 10 mPa s at 90° C.

In some implementations, a method of preparing a compound having a formula

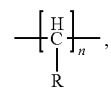

where n is 40-400 and at each instance R is independently selected from the group consisting of $R_1$, $R_2$ and $R_3$, and where
$R_1$ is

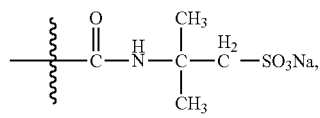

$R_2$ is

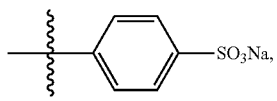

and
$R_3$ is

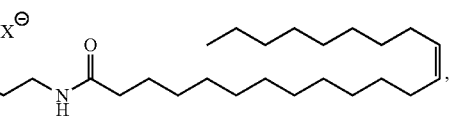

and where X is halide, includes combining reactants in a reaction chamber. The reactants include 2-acrylamido-2-methylpropane sulfonic acid, a p-styrenesulfonate salt, and a erucyl amidopropyl dimethyl allyl ammonium salt. The method includes purging the reaction chamber with an inert gas, initiating a free radical polymerization in a polymerization reaction solution, and purifying the compound.

This aspect, taken alone or combinable with any other aspect, can include the following features. Initiating the free radical polymerization includes adding an initiation complex to the reactants.

This aspect, taken alone or combinable with any other aspect, can include the following features. Adding the initiation complex to the reactants includes adding at least one of a peroxydisulfide salt and 2,2'-azobis[2-(2-imidazolin-2-yl)propane]dihydrochloride.

This aspect, taken alone or combinable with any other aspect, can include the following features. The method includes heating the polymerization reaction solution.

This aspect, taken alone or combinable with any other aspect, can include the following features. Heating the polymerization reaction solution includes heating the polymerization reaction solution to a temperature of 30° C.

This aspect, taken alone or combinable with any other aspect, can include the following features. Heating the polymerization reaction solution includes heating the polymerization reaction solution in a tempering kettle.

This aspect, taken alone or combinable with any other aspect, can include the following features. After initiating the polymerization reaction the polymerization reaction proceeds for 2-24 hours.

This aspect, taken alone or combinable with any other aspect, can include the following features. The polymerization reaction is terminated after 24 hours.

This aspect, taken alone or combinable with any other aspect, can include the following features. Purifying the compound includes precipitating the compound.

This aspect, taken alone or combinable with any other aspect, can include the following features. Precipitating the compound includes precipitating the compound with ethanol.

This aspect, taken alone or combinable with any other aspect, can include the following features. The compound is dried in a vacuum oven.

The following units of measure have been mentioned in this disclosure:

| Unit of Measure | Full form |
| --- | --- |
| g | gram |
| mg | milligram |
| cc | cubic centimeters |
| L | liter |
| mL | milliliter |
| wt % | percent by weight |
| ppm | parts per million |
| ppb | parts per billion |
| psi | pounds per square inch |
| kPa | kilopascal |
| mPa | milipascal |
| s | second |
| $s^{-1}$ | per second |
| hr | hour |
| rpm | rotations per minute |
| ° C. | degree Celsius |
| $cm^{-1}$ | inverse centimeter (wavenumber) |
| MDa | megadalton |

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

As used in this disclosure, the term "subterranean material" or "subterranean zone" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications may be made without departing from the spirit and scope of the disclosure.

What is claimed is:

1. A compound having a formula:

wherein n is 40-400 and at each instance R is independently selected from the group consisting of $R_1$, $R_2$ and $R_3$, wherein $R_1$ is

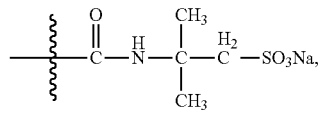

$R_2$ is

and $R_3$ is

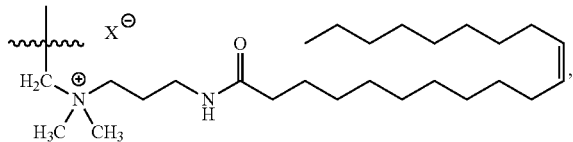

wherein X is halide, and
wherein a mole ratio of $R_1$ to $R_2$ to $R_3$ is 100 moles $R_1$ to 2-15 moles $R_2$ to 0.05-0.2 moles $R_3$.

2. The compound of claim 1, wherein the mole ratio of $R_1$ to $R_2$ to $R_3$ is 100 moles $R_1$ to 2 moles $R_2$ to 0.1 moles $R_3$.

3. The compound of claim 1, wherein the mole ratio of $R_1$ to $R_2$ to $R_3$ is 100 moles $R_1$ to 10 moles $R_2$ to 0.05 moles $R_3$.

4. The compound of claim 1, wherein the compound has a $T_{15}$ value as measured by thermal gravimetric analysis that is greater than 300° C.

5. The compound of claim 1, wherein the compound has a $T_{20}$ value as measured by thermal gravimetric analysis that is greater than 320° C.

6. The compound of claim 1, wherein the compound has a molecular weight of 1-10 MDa.

7. The compound of claim 1, wherein the compound has a viscosity averaged molecular weight of the compound is 1-10 MDa.

8. The compound of claim 1, wherein the compound has a number average molar mass of 40-400 MDa.

9. The compound of claim 1, wherein the compound has a polydispersity index of 1-3.

10. The compound of claim 1, wherein the compound has a C* value of about 1290 at 25° C.

11. The compound of claim 1, wherein the compound has a C* value of about 1510 at 90° C.

12. The compound of claim 1, wherein the compound has a viscosity of greater than 20 mPa·s at 25° C.

13. The compound of claim 1, wherein the compound has a viscosity of greater than 10 mPa·s at 90° C.

14. A method of preparing a compound having a formula:

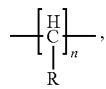

wherein n is 40-400 and at each instance R is independently selected from the group consisting of $R_1$, $R_2$ and $R_3$, wherein
$R_1$ has the formula

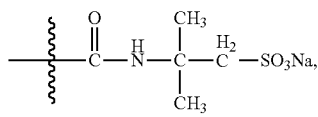

$R_2$ has the formula and

and
$R_3$ has the formula

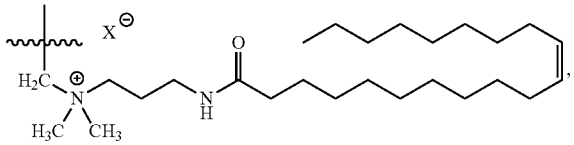

wherein X is halide, and wherein the method comprises combining reactants in a reaction chamber, wherein the reactants comprise
2-acrylamido-2-methylpropane sulfonic acid,
a p-styrenesulfonate salt, and
a erucyl amidopropyl dimethyl allyl ammonium salt,
purging the reaction chamber with an inert gas,
initiating a free radical polymerization in a polymerization reaction solution, and purifying the compound.

15. The method of claim 14, wherein initiating the free radical polymerization comprises adding an initiation complex to the reactants.

16. The method of claim 15, wherein adding the initiation complex to the reactants comprises adding at least one of a peroxydisulfide salt and 2,2'-azobis[2-(2-imidazolin-2-yl)propane]dihydrochloride.

17. The method of claim 14, further comprising heating the polymerization reaction solution.

18. The method of claim 17, wherein heating the polymerization reaction solution comprising heating the polymerization reaction solution to a temperature of 30° C.

19. The method of claim 16, wherein heating the polymerization reaction solution comprises heating the polymerization reaction solution in a tempering kettle.

20. The method of claim 14, wherein after initiating the polymerization reaction the polymerization reaction proceeds for 2-24 hours.

21. The method of claim 19, further comprising terminating the polymerization reaction after 24 hours.

22. The method of claim 14, wherein purifying the compound comprises precipitating the compound.

23. The method of claim 22, wherein precipitating the compound comprises precipitating the compound with ethanol.

24. The method of claim 22, further comprising drying the compound in a vacuum oven.

* * * * *

UNITED STATES PATENT AND TRADEMARK OFFICE
CERTIFICATE OF CORRECTION

PATENT NO. : 11,820,842 B2  
APPLICATION NO. : 17/015799  
DATED : November 21, 2023  
INVENTOR(S) : Xuan Zhang et al.

Page 1 of 1

It is certified that error appears in the above-identified patent and that said Letters Patent is hereby corrected as shown below:

In the Claims

Column 19, Lines 3-10, Claim 1, please replace " 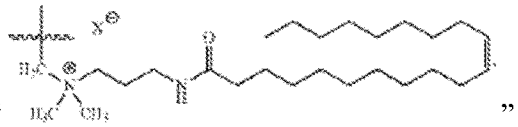 "

with -- 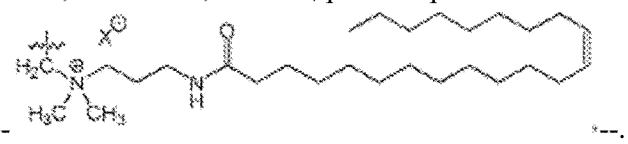 --.

Column 20, Lines 13-18, Claim 14, please replace " 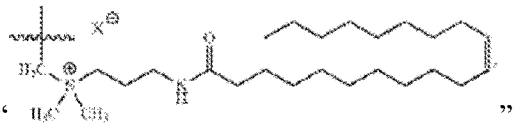 "

with --  --.

Signed and Sealed this  
Thirteenth Day of February, 2024

Katherine Kelly Vidal  
*Director of the United States Patent and Trademark Office*